Patented Mar. 11, 1924.

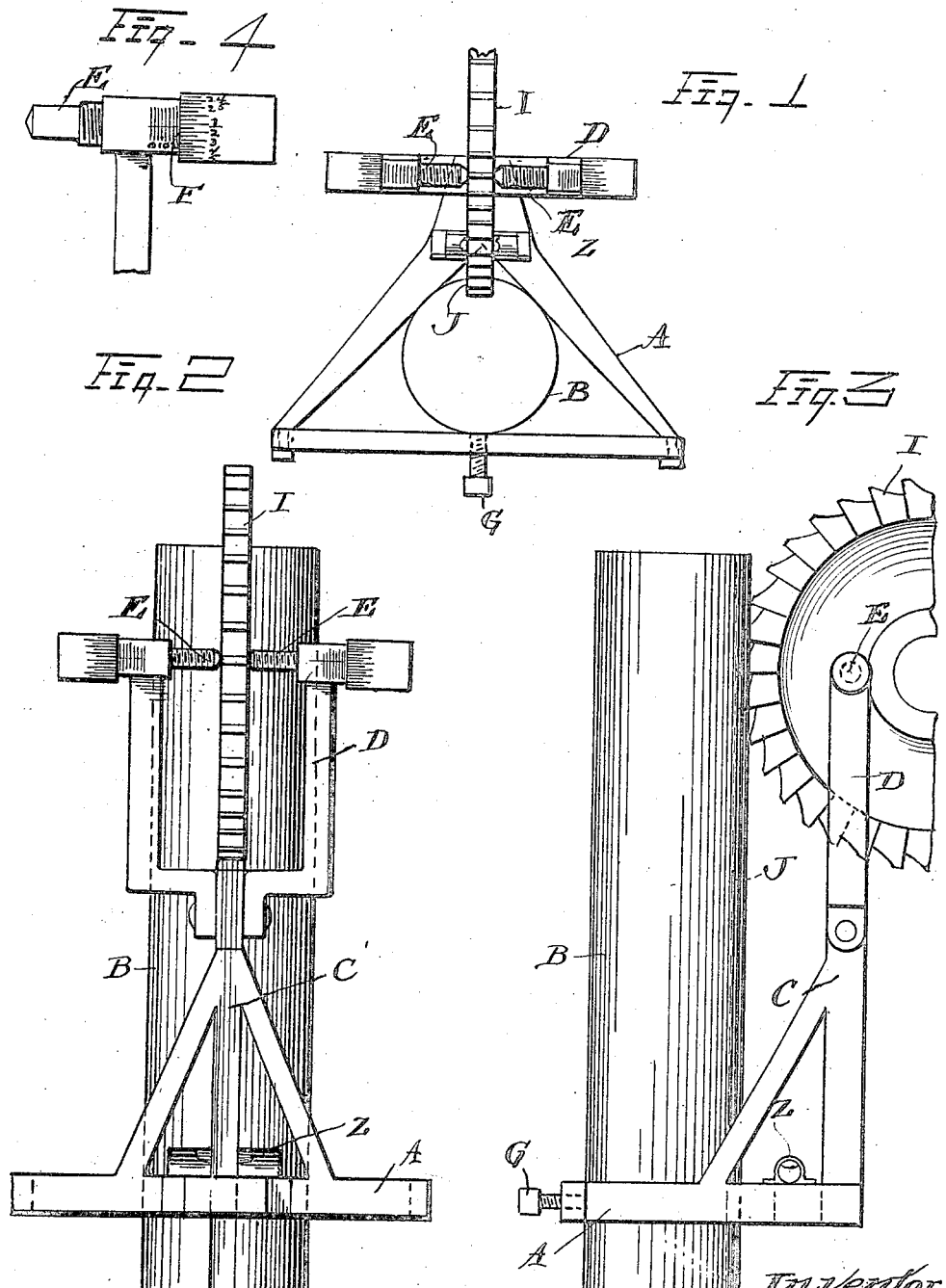

1,486,667

UNITED STATES PATENT OFFICE.

WILLIAM J. JERMAN, OF CLEVELAND, OHIO.

GAUGE FOR CENTERING SHAFTS.

Application filed November 20, 1920. Serial No. 425,386.

*To all whom it may concern:*

Be it known that I, WILLIAM J. JERMAN, a citizen of the United States, and a resident of Cleveland, in the county of Cuyahoga and State of Ohio, have invented certain new and useful Improvements in Gauge for Centering Shafts, of which I hereby declare the following to be a full, clear, and exact description, such as will enable others skilled in the art to which it appertains to make and use the same.

The objects of the invention are to provide a simple, convenient and accurate gauge or centering device for a shaft which will enable the workman to position a cutting tool, such as a key-way cutter, correctly, or will indicate positions definitely offset from the axial plane of the shaft correctly to the thousandths of an inch.

The invention is exemplified in the accompanying drawings, hereinafter more fully described, and specifically pointed out in the claims.

In the accompanying drawings, Fig. 1 is a plan of the device; Fig. 2 is a rear elevation thereof, and Fig. 3 is a side elevation thereof. Fig. 4 is an enlarged side elevation of one of the micrometer adjustments.

In these views, A is a frame or right triangle which is applied to the shaft, B. At the rear of the right angle of the triangular frame is positioned a vertical standard, C, mounted upon the frame or base A and at the upper extremity of this standard is shown a fork, D, at the sides of which are positioned screws, E, E, the bodies or heads of which are finely graduated at F, F, permitting a micrometer adjustment of the screws.

The shaft is secured in the frame by means of a diametrically directed screw, G. in the frame A in a line bisecting the right angle of the frame, and a level, Z, on the frame, indicates when the triangular base, A, is horizontal.

The scribing or cutting tool, shown at I, is then inserted between the inner extremities of the screws E, E, and when the gauges thereon indicate like measurements the tool will be properly centered. The milling cutter shown is in the act of cutting a key-way, J, in the shaft.

If a position at the right or left of an axial plane of the shaft is desired, the exact distance from the center of the shaft can be found by manipulating the gauge screws until the required position is found. The tool can be held in the vise of a milling cutter or other machine.

Having described the invention, what I claim as new and desire to secure by Letters Patent, is:

1. In a device for accurately positioning a scribing cutter with reference to a shaft upon which the cutter is to operate, in combination, a base member having diverging arms, a bar connecting the outer extremities of said arms, a radial securing means in said bar, a vertical support mounted upon said base at the junction of said arms, a fork at the free extremity of said support, and transversely adjustable gauge screws in the arms of said fork.

2. In a device for accurately positioning a scribing cutter with reference to a shaft upon which the cutter is to operate, in combination, a base member provided with diverging arms, a rigid connection between the extremities of said arms, a support vertically mounted at the point of junction of said arms, a fork at the free extremity of said support, transversely adjustable gauge screws in the arms of said fork, and micrometer adjustments for said gauge screws.

In testimony whereof, I hereunto set my hand this 25" day of August 1920.

WILLIAM J. JERMAN.

In presence of—
WM. M. MONROE,
S. W. SANGSTER.